(12) United States Patent
Castro et al.

(10) Patent No.: US 7,340,541 B2
(45) Date of Patent: Mar. 4, 2008

(54) METHOD OF BUFFERING BIDIRECTIONAL DIGITAL I/O LINES

(75) Inventors: Rafael Castro, Round Rock, TX (US); Andrew B. Moch, Pfugerville, TX (US); Sean M. Nickel, Pittsburgh, PA (US)

(73) Assignee: National Instruments Corporation, Austin, TX (US)

( * ) Notice: Subject to any disclaimer, the term of this patent is extended or adjusted under 35 U.S.C. 154(b) by 477 days.

(21) Appl. No.: 10/936,088

(22) Filed: Sep. 8, 2004

(65) Prior Publication Data

US 2005/0080954 A1   Apr. 14, 2005

Related U.S. Application Data

(60) Provisional application No. 60/601,860, filed on Aug. 16, 2004.

(51) Int. Cl.
*G06F 13/00* (2006.01)

(52) U.S. Cl. .............................. 710/31; 710/52; 710/58; 326/93; 326/94

(58) Field of Classification Search .................. 710/29, 710/31, 52
See application file for complete search history.

(56) References Cited

U.S. PATENT DOCUMENTS 5,282,271 A * 1/1994 Hsieh et al. ................... 326/38
5,471,581 A    11/1995 Munier et al.
5,625,780 A *  4/1997 Hsieh et al. ................. 710/316
5,736,870 A *  4/1998 Greason et al. ............... 326/86
6,105,070 A    8/2000 Gaylord
6,289,402 B1 * 9/2001 Davis .......................... 710/31
6,748,508 B1   6/2004 Khandelwal et al.
6,834,318 B2 * 12/2004 Hunter et al. ................ 710/110
2002/0083232 A1* 6/2002 Dute et al. ..................... 710/31
2004/0039866 A1* 2/2004 Cheung ....................... 710/305
2004/0044811 A1* 3/2004 Vrancic ....................... 710/53
2004/0243744 A1  12/2004 Smith et al.
2004/0257860 A1  12/2004 Fenstermaker et al.

* cited by examiner

*Primary Examiner*—Kim Huynh
*Assistant Examiner*—Jonathan R. Plante
(74) *Attorney, Agent, or Firm*—Meyertons Hood Kivlin Kowert & Goetzel, P.C.; Jeffrey C. Hood; Mario J. Lewin

(57) ABSTRACT

A system and method for buffering bidirectional digital input/output (I/O) lines. The system (e.g., data acquisition system) may comprise a device including circuitry for buffering bidirectional digital lines. A first integrated circuit (IC) of the device includes a first and a second bidirectional buffer coupled to a first bidirectional digital I/O line, and a second IC of the device includes a third bidirectional buffer. The first IC and the second IC each include a control unit to control the driving direction of the corresponding bidirectional buffers independently to change the direction of the data flow through the first bidirectional digital I/O line from the output direction to the input direction or vice versa. The driving direction of the bidirectional buffers are changed at different times in a particular sequence, and the order depends on whether the direction change is from the output direction to the input direction or vice versa.

19 Claims, 4 Drawing Sheets

Input to Output Direction

|  | Initial Direction | First Direction Change | Second Direction Change | Third Direction Change |
|---|---|---|---|---|
| First Bidirectional Buffer 310 | Input | Input | Input | Output |
| Second Bidirectional Buffer 320 | Input | Output | Output | Output |
| Third Bidirectional Buffer 330 | Input | Input | Output | Output |

*Fig. 4A*

Output to Input Direction

|  | Initial Direction | First Direction Change | Second Direction Change | Third Direction Change |
|---|---|---|---|---|
| First Bidirectional Buffer 310 | Output | Input | Input | Input |
| Second Bidirectional Buffer 320 | Output | Output | Output | Input |
| Third Bidirectional Buffer 330 | Output | Output | Input | Input |

*Fig. 4B*

METHOD OF BUFFERING BIDIRECTIONAL DIGITAL I/O LINES

PRIORITY CLAIM

This application claims benefit of priority of U.S. provisional application Ser. No. 60/601,860 titled "Improved Method of Buffering Bidirectional Digital I/O Lines", filed Aug. 16, 2004, and whose inventors are Rafael Castro, Andrew B. Moch, and Sean M. Nickel.

BACKGROUND OF THE INVENTION

1. Field of the Invention

This invention relates generally to measurement and data acquisition systems and, more particularly, to a system and method for buffering bidirectional digital I/O lines.

2. Description of the Related Art

Scientists and engineers often use measurement systems to perform a variety of functions, including measurement of a physical phenomena or unit under test (UUT), test and analysis of physical phenomena, process monitoring and control, control of mechanical or electrical machinery, data logging, laboratory research, and analytical chemistry, to name a few examples.

A typical measurement system comprises a computer system with a measurement device or measurement hardware. The measurement device may be a computer-based instrument, a data acquisition device or board, a programmable logic device (PLD), an actuator, or other type of device for acquiring or generating data. The measurement device may be a card or board plugged into one of the I/O slots of the computer system, or a card or board plugged into a chassis, or an external device. For example, in a common measurement system configuration, the measurement hardware is coupled to the computer system through a PCI bus, PXI (PCI extensions for Instrumentation) bus, a GPIB (General-Purpose Interface Bus), a VXI (VME extensions for Instrumentation) bus, a serial port, parallel port, or Ethernet port of the computer system. Optionally, the measurement system includes signal conditioning devices which receive the field signals and condition the signals to be acquired.

A measurement system may typically include transducers, sensors, or other detecting means for providing "field" electrical signals representing a process, physical phenomena, equipment being monitored or measured, etc. The field signals are provided to the measurement hardware. In addition, a measurement system may also typically include actuators for generating output signals for stimulating a unit under test.

Measurement systems, which may also be generally referred to as data acquisition systems, may include the process of converting a physical phenomenon (such as temperature or pressure) into an electrical signal and measuring the signal in order to extract information. PC-based measurement and data acquisition (DAQ) systems and plug-in boards are used in a wide range of applications in the laboratory, in the field, and on the manufacturing plant floor.

In a measurement or data acquisition process, analog signals may be received by a digitizer, which may reside in a DAQ device or instrumentation device. The analog signals may be received from a sensor, converted to digital data (possibly after being conditioned) by an Analog-to-Digital Converter (ADC), and transmitted to a computer system for storage and/or analysis. When a measurement system generates an output analog signal, the computer system may generate digital signals that are provided to one or more digital to analog converters (DACs) in the DAQ device. The DACs convert the digital signal to an output analog signal that is used, e.g., to stimulate a UUT.

Multifunction DAQ devices typically include digital I/O capabilities in addition to the analog capabilities described above. Digital I/O applications may include monitoring and control applications, video testing, chip verification, and pattern recognition, among others. DAQ devices may include one or more general-purpose, bidirectional digital I/O lines to transmit and receive digital signals to implement one or more digital I/O applications.

Digital data received from a signal source (e.g., a sensor) via bidirectional digital I/O lines of a device (e.g., a DAQ device) may be buffered before the data is processed. For example, a DAQ device may include a buffer device that may be coupled to one or more bidirectional digital I/O lines. The buffer device may include one or more bidirectional buffers for each I/O line, which may be configured as either an input or an output. Also, the DAQ device may include a second device having one or more bidirectional buffers. The second device may be coupled to the buffer device via a device bus to receive the data.

To receive data from the signal source, one of the bidirectional buffers of the buffer device may be configured as an input. At the same time, the corresponding bidirectional buffers of the second device may be configured as inputs. In this configuration, the data flow may be from the buffer device to the second device. There may be two options to switch the data flow to the opposite direction (i.e., from the second device to the buffer device). Typically, in an "off-the-shelf" buffer device one pin controls both sides of the buffer. Therefore, in one example, to change the data flow to the opposite direction, both sides of the buffer device may be switched from an input to an output. However, the buffer in the second device may remain configured as an input, which may float the device bus and cause glitches to show up at the source. In another example, the buffer in the second device may be changed from an input to an output without the bidirectional buffers in the buffer device having changed. In this case, both the buffer device and the second device may be driving data towards the device bus; therefore, this option may result in bus contention due to the double driving of the device bus.

SUMMARY OF THE INVENTION

Various embodiments of a system and method are disclosed for buffering bidirectional digital input/output (I/O) lines. In one embodiment, the system (e.g., a data acquisition system) may comprise a device including circuitry for buffering bidirectional digital lines. The device may be any type of device having one or more bidirectional (bi-directional) digital I/O lines, e.g., a data acquisition device. The device may include a first integrated circuit (IC) and a second IC. The first IC preferably includes a first bidirectional buffer coupled to a first bidirectional digital I/O line and a second bidirectional buffer coupled to the first bidirectional buffer. The first IC may also include a first control unit to control a driving direction of each of the first and second bidirectional buffers independently to change the direction of the data flow through the first bidirectional digital I/O line from a first direction to a second direction (relative to the device). In one embodiment, the second IC may include a third bidirectional buffer. Also, the second IC may comprise a second control unit to control a driving direction of the third bidirectional buffer to change the direction of the data flow through the first bidirectional digital I/O line from a first direction to a second direction (relative to the device).

The second control unit of the second IC may be coupled to the first control unit of the first IC to send a command signal to the first control unit to change the driving direction of the first and second bidirectional buffers. The second control unit may operate in conjunction with the first control unit to change the driving direction of the bidirectional buffers. In one embodiment, the first control unit may receive the command signal from the second control unit to determine whether to change the direction of data flow corresponding to the first bidirectional digital I/O line. To change the direction of the data flow, the driving direction of the bidirectional buffers may be changed at different times in a particular order, and the order may depend on whether the direction change is from an input direction to an output direction (relative to the device) or vice versa. Since the driving direction of each of the bidirectional buffers may be changed at different times, a sequence of direction changes that minimizes problems related to the direction change (e.g., bus contention due to the double driving of a device bus) is preferably implemented. In one embodiment, the sequence of direction changes may be implemented in software, e.g., in the first and second control units, including an algorithm for synchronizing and controlling the direction changes. Both the first IC and the second IC may be configured with a protocol for implementing the algorithm.

The input direction refers to the data being transmitted into the device via, e.g., the first bidirectional digital I/O line. More specifically, when the data flow is in the input direction, the first bidirectional buffer of the first IC is configured as an input, the second bidirectional buffer of the first IC is configured as an output, and the third bidirectional buffer of the second IC is configured as an input. The output direction refers to the data being transmitted out of the device via, e.g., the first bidirectional digital I/O line. More specifically, when the data flow is in the output direction, the third bidirectional buffer of the second IC is configured as an output, the second bidirectional buffer of the first IC is configured as an input, and the first bidirectional buffer of the first IC is configured as an output.

The sequence of direction changes implemented by the first and second control units to change the direction of the data flow through the first bidirectional digital I/O line from the input direction to the output direction is described below. First, the driving direction of the second bidirectional buffer may be changed from the input direction to the output direction. In the next clock cycle, the driving direction of the third bidirectional buffer may be changed from the input direction to the output direction. Finally, in the following clock cycle, preferably after giving the data time to propagate through the first IC, the driving direction of the first bidirectional buffer may be changed from the input direction to the output direction. After the driving direction of all three bidirectional buffers are changed as described above, the direction of the data flow is considered changed to the output direction and therefore the data may be output from the device.

The sequence of direction changes implemented by the first and second control units to change the direction of the data flow through the first bidirectional digital I/O line from an output direction to an input direction is described below. First, the driving direction of the first bidirectional buffer may be changed from the output direction to the input direction. In the next clock cycle, the driving direction of the third bidirectional buffer may be changed from the output direction to the input direction. Finally, in the following clock cycle, the driving direction of the second bidirectional buffer may be changed from the output direction to the input direction. After the driving direction of all three bidirectional buffers are changed as described above, the direction of the data flow is considered changed to the input direction and therefore the data may be received by the device.

In one embodiment, the first and the second control units may control the direction of the data flow of each of a plurality of the bidirectional lines (e.g., the first bidirectional digital I/O line). The first and second control units may change the direction of the data flow corresponding to all the lines, none of the lines, or a portion of the lines, and the direction of the data flow in each of the lines may be independent of the direction of the data flow in the remaining lines. The control units may control the direction of the data flow through each of the bidirectional digital I/O lines independently by controlling the driving direction of the corresponding bidirectional buffers of each line independently.

BRIEF DESCRIPTION OF THE DRAWINGS

FIG. 4A is a chart showing the sequence of direction changes to change the direction of the data flow through a bidirectional digital I/O line from an input direction to an output direction, according to one embodiment of the invention; and FIG. 4B is a chart showing the sequence of direction changes to change the direction of the data flow through a bidirectional digital I/O line from an output direction to an input direction, according to one embodiment of the invention.

Figure 1:
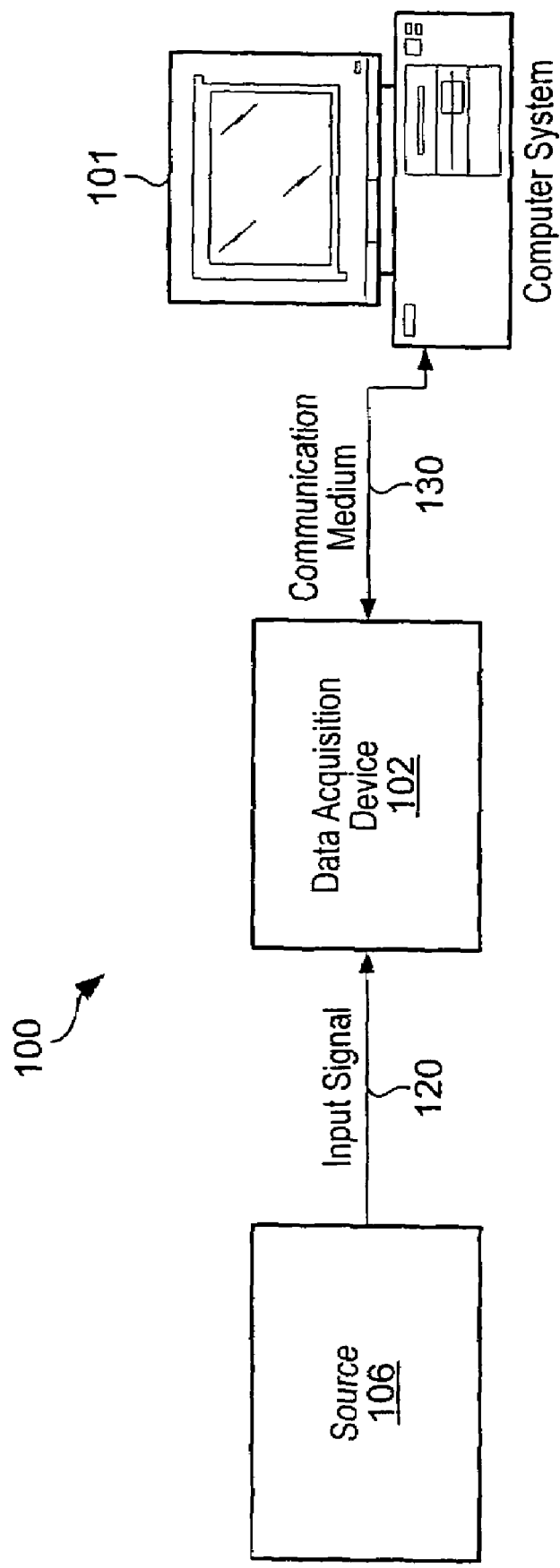
FIG. 1 is a diagram of one embodiment of a computer-based measurement system or data acquisition system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION

FIG. 1: Data Acquisition System

FIG. 1 is a diagram of one embodiment of a computer-based measurement system or data acquisition system 100. The data acquisition system 100 may comprise a computer system 101, which may be coupled to a measurement device, referred to as data acquisition (DAQ) device 102, through a communication medium 130. The DAQ device 102 may be an internal card or board coupled to a bus, e.g., a Peripheral Component Interconnect (PCI), PCI Express, Industry Standard Architecture (ISA), or Extended Industry Standard Architecture (EISA) bus, but is shown external to the computer 101 for illustrative purposes. The measurement device or DAQ device 102 may also be an external device coupled to the computer system 101. In this embodiment, the communication medium 130 may be a serial bus, such as USB, IEEE 1394, MXI bus, Ethernet, or a proprietary bus, or a parallel bus such as GPIB or others. It is noted that the communication medium 130 may be a wired or wireless communication medium.

The DAQ device 102 may be coupled to an external source 106, such as an instrument, sensor, transducer, or actuator from which the DAQ device 102 may receive an input signal 120, e.g., an analog input such as sensor data. In one example, the external source 106 may be a temperature sensor, which is comprised in a unit under test (UUT). In this example, the DAQ device 102 may receive temperature reading from the temperature sensor and convert the analog data to digital form to be sent to the computer system 101 for analysis. Additionally, the DAQ device 102 may receive a digital input, e.g., a binary pattern, from the external source 106 (e.g., a UUT). Furthermore, the DAQ device 102 may also produce analog or digital signals, e.g., for stimulating the UUT.

The computer system 101 may be operable to control the DAQ device 102. For example, the computer system 101 may be operable to direct the DAQ device 102 to perform an acquisition, and may obtain data from the DAQ device 102 for storage and analysis therein. Additionally, the computer system 101 may be operable to send data to the DAQ device 102 for various purposes, such as for use in generating analog signals used for stimulating a UUT.

The computer system 101 may include a processor, which may be any of various types, including an x86 processor, e.g., a Pentium™ class, a PowerPC™ processor, a CPU from the SPARC™ family of RISC processors, as well as others. Also, the computer system 101 may also include one or more memory subsystems (e.g., Dynamic Random Access Memory (DRAM) devices). The memory subsystems may collectively form the main memory of computer system 101 from which programs primarily execute. The main memory may be operable to store a user application and a driver software program. The user application may be executable by the processor to conduct the data acquisition/generation process. The driver software program may be executable by the processor to receive data acquisition/generation tasks from the user application and program the DAQ device 102 accordingly.

Figure 2:
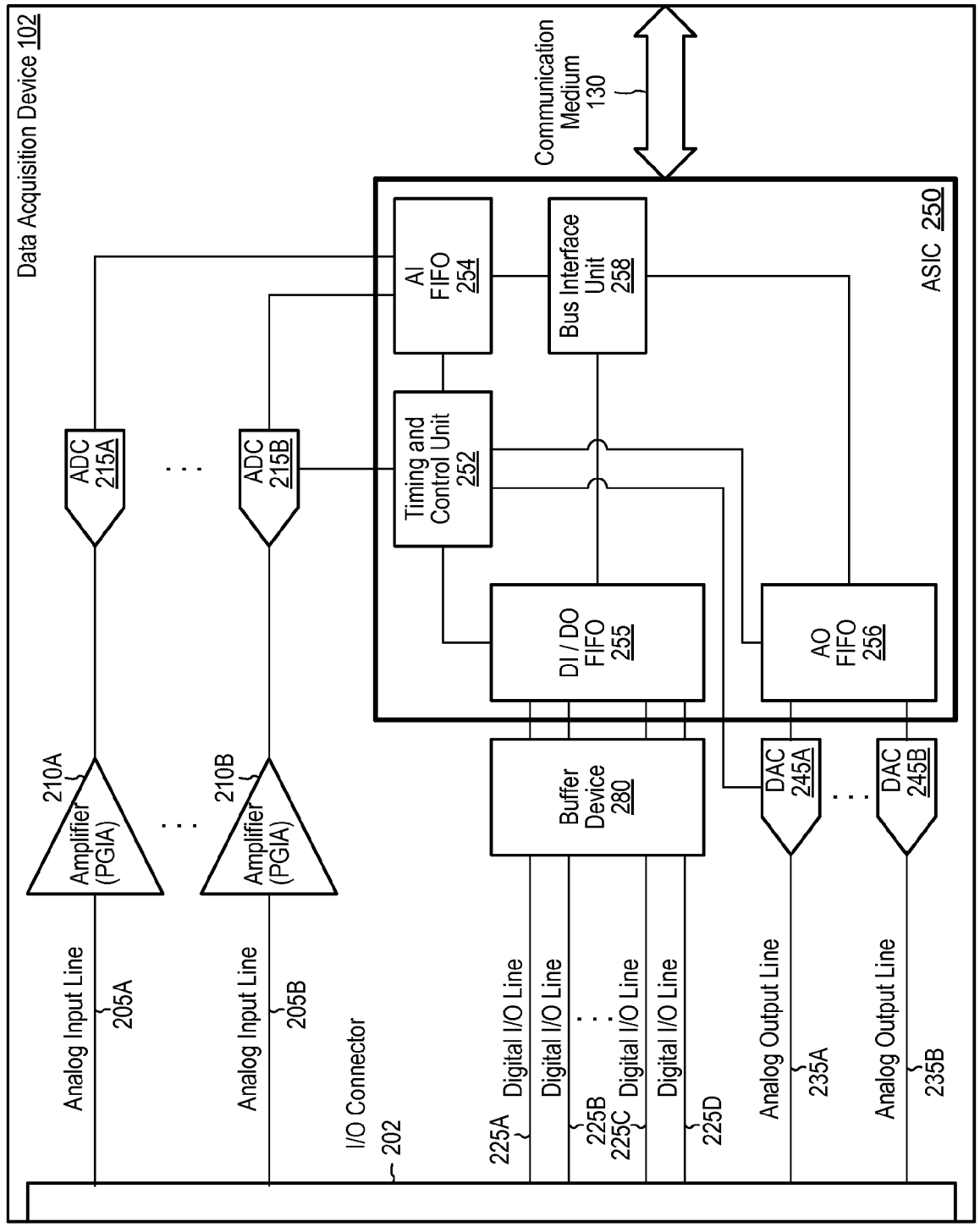
FIG. 2 is a block diagram of one embodiment of a data acquisition (DAQ) device.

FIG. 2: Data Acquisition Device

FIG. 2 is a block diagram of one embodiment of a data acquisition (DAQ) device 102. Components that correspond to those shown in FIG. 1 are numbered identically for simplicity and clarity. As described above, the DAQ device 102 may be an internal device coupled to, e.g., a PCI bus, or may also be an external device coupled to the computer system 101 via a serial bus, e.g., MXI bus, or a parallel bus, e.g., a GPIB. The DAQ device 102 may be a board or a module comprising one or more integrated circuits (ICs) or the DAQ device 102 may be an IC, for example, a mixed-signal IC.

The DAQ device 102 may comprise an input/output (I/O) connector 202, analog input lines 205A and 205B, amplifiers 210A and 210B, analog-to-digital converters (ADCs) 215A and 215B, digital I/O lines 225A, 225B, 225C, and 225D, analog output lines 235A and 235B, a timing and data control IC (e.g., application-specific integrated circuit (ASIC) 250), digital-to-analog converters (DACs) 245A and 245B, a buffer device 280, and communication medium 130. It should be noted that the components described with reference to FIG. 2 are meant to be exemplary only, and are not intended to limit the invention to any specific set of components or configurations. For example, in various embodiments, one or more of the components described may be omitted, combined, modified, or additional components included, as desired.

The DAQ device 102 may receive and send digital and/or analog data via the input and output lines of the I/O connector 202. For example, the I/O connector 202 may be coupled to a signal source (e.g., source 106 of FIG. 1) comprised in a UUT to receive analog signals. The I/O connector 202 may comprise analog input lines 205A and 205B, which may convey the received analog signals to amplifier 210A and 210B. It is noted however that in other embodiments the DAQ device 102 may comprise any number of analog input lines, e.g., three or more analog input lines.

In one embodiment, amplifiers 210A and 210B may be programmable gain instrumentation amplifiers (PGIAs). PGIAs are typically differential amplifiers having a high input impedance and a gain that is adjustable through the variation of a single resistor. The amplifier 210A may apply a specified amount of gain to the input signal to ensure proper analog-to-digital conversion. Also, PGIAs may convert differential input signals into single-ended outputs, which may be needed for the ADC (e.g., ADC 215A) to correctly digitize the data. It is noted however that in other embodiments amplifier 210A and/or amplifier 210B may be other types of amplifiers typically used in data acquisition devices. It is also noted that DAQ device 102 may comprise any number of amplifiers, e.g., three or more amplifiers.

The output of amplifier 210A may be connected to ADC 215A, which may digitize the analog signals. ADCs are devices that convert a continuously varying (analog) signal into a discrete (digital) signal. The resolution of the ADC typically indicates the number of discrete values it can produce. For example, if the ADC has an eight-bit resolution, the ADC may be able to encode an analog input to one of 256 discrete values (since $2^8=256$). Each discrete value is derived by sampling the analog signal at a predetermined rate (i.e., the sampling rate of the ADC). More specifically, the signal values at particular time intervals are measured and stored. An ADC typically includes a sample and hold circuit, which holds the input value constant during the time the ADC performs the analog-to-digital conversion, since the ADC cannot make an instantaneous conversion. It is noted however that in other embodiments the DAQ device 102 may comprise any number of ADCs, for example, the DAQ device 102 may include a single ADC or four ADCs.

After the signals are digitized, the ADC 215A may send the digital signals to the ASIC 250. In one embodiment, the ASIC 250 may be a mixed-signal ASIC, which may be configured to perform the timing and data control functions for the DAQ device 102. It is noted however that in other embodiments other types of timing and data control ICs may be used. The ASIC 250 may include a timing and control unit 252, an analog input (AI) first-in first-out (FIFO) buffer 254, a digital input (DI)/digital output (DO) FIFO buffer 255, an analog output (AO) FIFO buffer 256, and a bus interface unit 258. It is noted that in other embodiments one or more of the components described may be omitted, combined, modified, or additional components included, as desired.

When the ASIC 250 receives the digitized signals, the data may be stored in AI FIFO buffer 254. FIFO buffers are storage devices that output the stored data in the order the data was received. After being stored in the AI FIFO buffer 254, the digitized data may be sent to the bus interface unit 258. In one embodiment, the bus interface unit 258 may be coupled to the communication medium 130 for sending data to and receiving data from a computer system (e.g., computer system 101 of FIG. 1). The bus interface unit 258 may be operable to implement the protocol associated with the type of bus coupled to the DAQ device 102. As described above, exemplary buses coupled to the bus interface unit 258 include a PCI, PCI Express, USB, IEEE 1394, PXI bus, or Ethernet, among others. In one embodiment, the bus interface unit 258 may send the digitized data to the computer system 101 for storage and analysis of the data.

As described above, the computer system (e.g., computer system 101 of FIG. 1) may provide digital signals to the DAQ device 102 to stimulate a UUT. In one embodiment, the digital signals may need to be converted to analog form to stimulate the UUT. Therefore, in this embodiment, after the ASIC 250 of DAQ device 102 receives the digital signals and stores them in AO FIFO buffer 256, the digital data may be transmitted to DAC 245A to be converted to analog form. DACs are devices that convert discrete (digital) signals into continuously varying (analog) signals. For example, if an analog signal was initially converted to digital form, a DAC may be able to reproduce the analog signal if provided with the digital data. It is noted that the DAQ device 102 may comprise any number of DACs, for example, other embodiments may include a single DAC or four DACs. After the digital data is converted to analog form, the analog signals may be sent to the I/O connector 202 via the analog output line 235A.

In one embodiment, digital signals may be received at the I/O connector 202. The received digital signals may be sent to the ASIC 250 via one or more of the digital I/O lines 225A-D. In one embodiment, the digital I/O lines 225A-D are general-purpose, bidirectional digital I/O lines, which may be configured to send and receive digital data. In one embodiment, the buffer device 280 is coupled between the I/O connector 202 and the ASIC 250 for buffering the one or more bidirectional digital I/O lines 225A-D (as will be further described below with reference to FIG. 3). The buffer device 280 may include one or more bidirectional buffers for each I/O line, which may be configured as either an input or an output. When the ASIC 250 receives the digital signals, the data may be stored in the DI/DO FIFO buffer 255. After being stored in the DI/DO FIFO buffer 255, the digital data may be sent to the bus interface unit 258, which may convey the digital data to the computer system 101, as described above. It is noted that digital data received via the bus interface unit 258 may also be stored in DI/DO FIFO buffer 255 before being sent to the I/O connector 202 via one or more of the digital I/O lines 225A-D.

The ASIC 250 may include the timing and control unit 252 to provide timing and control and data management functions for the DAQ device 102 during, e.g., a data acquisition process. The timing and control unit may comprise one or more counter/timers, which may be used in various applications, including counting the occurrences of a digital event, digital pulse timing, and generating square waves and pulses. The timing and control unit 252 may be coupled to one or more of the FIFO buffers (e.g., AO FIFO buffer 256) of the DAQ device 102 to provide timing and control signals for storing data received from, e.g., the bus interface 258 or the ADC 215A, and for sending data to, e.g., DAC 245A. Furthermore, the timing and control unit 252 may be coupled to the ADCs (e.g., ADC 215A) and DACs (e.g., ADC 245A) of the DAQ device 102 to provide timing and control signals for performing the data conversion functions that may be necessary in a data acquisition process.

In one embodiment, the timing and control unit 252 and/or the bus interface unit 258 may be implemented in hardware. In a further embodiment, the timing and control unit 252 and/or the bus interface unit 258 may be implemented in software. In yet another embodiment, the timing and control unit 252 and/or the bus interface unit 258 may be implemented in both hardware and software. In one embodiment, the functionality described above with regard to the timing and control unit 252 and/or the bus interface unit 258 may be distributed across multiple components. In various embodiments, this type of functional distribution may also apply to other components described herein.

Figure 3:
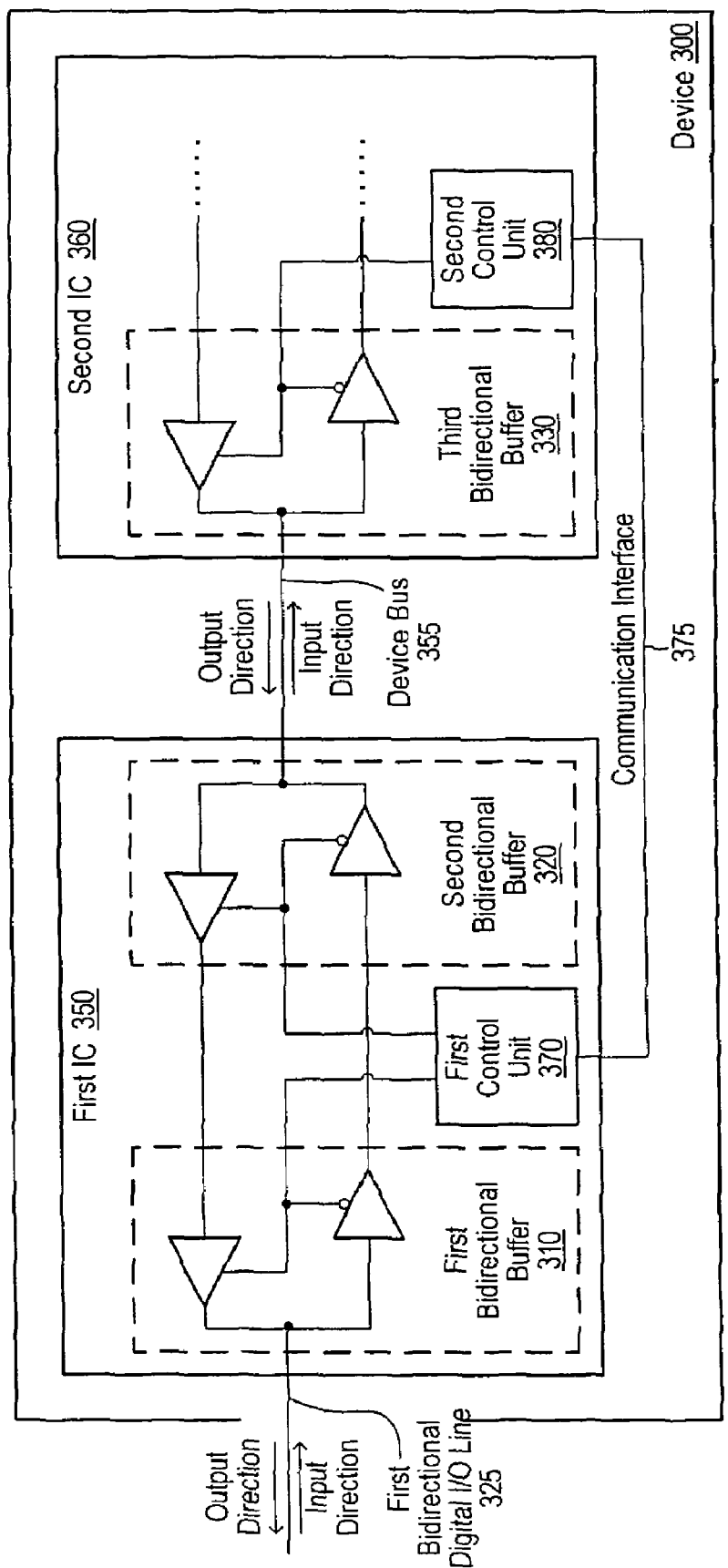
FIG. 3 is a block diagram of one embodiment of a device comprising circuitry for buffering bidirectional digital lines.

FIG. 3: Bidirectional Buffers

Turning now to FIG. 3, a block diagram of one embodiment of a device 300 comprising circuitry for buffering bidirectional digital lines is shown. The device 300 may be a board or a module comprising one or more integrated circuits (ICs) or the device 300 may be an IC, for example, a mixed-signal IC. More specifically, the device 300 may be any type of device comprising one or more bidirectional digital input/output (I/O) lines, such as the data acquisition device 102 of FIG. 2, a PCI extension for instrumentation (PXI) module, a graphics card, an Ethernet card, and a disk drive, among others. Additionally, the device 300 may be comprised in any type of system (e.g., computer system 101 of FIG. 1), such as desktops, portable appliances, servers, communication products, workstations, and instrumentation chassis, among others.

The device 300 (e.g., the data acquisition device 102 of FIG. 2) may comprise a first IC 350 and a second IC 360. In one embodiment, the first IC 350 may be configured as a buffer device (e.g., the buffer device 280 of FIG. 2). It is noted however that in other embodiments the first IC 350 may be any type of device having bidirectional buffers. The first IC 350 may be coupled to one or more bidirectional digital I/O lines and may include a bidirectional buffer coupled to each of the bidirectional digital I/O lines. For example, the first IC 350 may include a first bidirectional buffer 310 coupled to a first bidirectional digital I/O line 325. The first IC 350 may also include a second bidirectional buffer 320 coupled to the first bidirectional buffer 310. In one embodiment, each of the bidirectional buffers may include a first and a second driver. The output of the first driver may be coupled to the input of the second driver and further coupled to a bidirectional digital I/O line. In this embodiment, the driving direction of each bidirectional buffer may be dependent upon which driver is turned on. The first IC 350 may also include a first control unit 370 to control the driving direction of the first and second bidirectional buffers 310 and 320, as will be further described below.

In one embodiment, the second IC 360 may be an application-specific integrated circuit (ASIC), for example, a timing and data control ASIC (e.g., ASIC 250 of FIG. 2). It is noted however that in other embodiments the second IC 360 may be any type of device having bidirectional buffers. The second IC 360 may include a third bidirectional buffer 330. The third bidirectional buffer 330 of the second IC 360 may be coupled to the first IC 350 via a device bus or interconnect 355. Also, the second IC 360 may comprise a second control unit 380. In one embodiment, a CPU of a computer system (e.g., computer system 101) comprised in a data acquisition system (e.g., data acquisition system 100) may communicate with the second IC 360 to notify the second control unit 380 to change the direction of the data flow through the bidirectional digital I/O lines (e.g., line 325) and through the device 300. The second control unit 380 may send commands to change the driving direction of the bidirectional buffers corresponding to each of the bidirectional digital I/O lines to change the direction of the data flow through the lines. It is noted that in other embodiments the direction of the data flow through the bidirectional digital I/O lines may be changed by other methods, for example, the CPU and/or the signal source may communicate directly with both of the first and second ICs 350 and 360.

The second control unit 380 may be coupled to the first control unit 370 of the first IC 350 via a communication interface 375. The second control unit 380 may send a command signal to the first control unit 370 to change the driving direction of the first and second bidirectional buffers 310 and 320. The second control unit 380 may operate in conjunction with the first control unit 370 to change the driving direction of the bidirectional buffers 310, 320, and 330. In one embodiment, the first control unit 370 may receive the command signal from the second control unit to determine whether to change the direction of data flow corresponding to, e.g., the bidirectional digital I/O line 325. As will be described further below, to change the direction of the data flow, the driving direction of the bidirectional buffers 310, 320, and 330 may be changed at different times in a particular order, and the order may depend on the change in direction. In one embodiment, the second control unit 380 may perform a register write to a register comprised in the first control unit 370 to change the driving direction of the first and second bidirectional buffers 310 and 320. It is noted however that in other embodiments the driving direction of the bidirectional buffers may be changed by other methods, for example, the second control unit 380 may directly control the driving direction of the bidirectional buffers 310, 320, and 330. It is also noted that in other embodiments the functionality described with respect to the first and second control units 370 and 380 may be implemented in a control unit external to both the first and the second ICs 350 and 360.

As described above, the second control unit 380 may perform a register write to a register comprised in the first control unit 370. In one embodiment, the register may control the direction of the data flow through each of a plurality of the bidirectional lines (e.g., bidirectional digital I/O line 325) and through the device 300. The control unit 370 may change the direction of the data flow corresponding to all the lines, none of the lines, or a portion of the lines, and the direction of the data flow in each of the lines may be independent of the direction of the data flow in the remaining lines. The register may control the direction of the data flow through each of the bidirectional digital I/O lines independently by controlling the driving direction of the corresponding bidirectional buffers of each line independently. For example, the register may control each of 32 bidirectional digital I/O lines independently by controlling the driving direction of the corresponding three bidirectional buffers of each line. In one embodiment, the first control unit 370 may also include additional registers for controlling additional bidirectional digital I/O lines, e.g., an additional 16 lines. In one embodiment, the second control unit 380 may also include one or more registers for independently controlling the respective bidirectional digital I/O lines. It is noted however that the device 300 may include any number of bidirectional digital I/O lines. It is also noted that each of the bidirectional digital I/O lines may be associated with any number of bidirectional buffers.

In one embodiment, the first control unit 370 and/or the second control unit 380 may be implemented in software, including an algorithm for synchronizing and controlling the changing of the driving direction of the bidirectional buffers 310, 320, and 330. It is noted however that in some embodiments the first control unit 370 and/or the second control unit 380 may be implemented in hardware. It is also noted that in other embodiments the first control unit 370 and/or the second control unit 380 may be implemented in both hardware and software. In one embodiment, the functionality described above with regard to the first control unit 370 and/or the second control unit 380 may be distributed across multiple components. In various embodiments, this type of functional distribution may also apply to other components described herein.

It should be noted that the components described with reference to FIG. 3 are meant to be exemplary only, and are not intended to limit the invention to any specific set of components or configurations. For example, in various embodiments, one or more of the components described may be omitted, combined, modified, or additional components included, as desired.

As described above, the first and second control units 370 and 380 may change the driving direction of the first, second, and third bidirectional buffers corresponding to the bidirectional digital I/O line 325 to change the direction of the data flow through the line 325. For example, the control units 370 and 380 may change the direction of the data flow from an input direction to an output direction, or vice versa. The input direction, as shown in FIG. 3, refers to when the data flows into the device 300, to the first IC 350, and then to the second IC 360. More specifically, when the data flow is in the input direction, the first bidirectional buffer of the first IC is configured as an input, the second bidirectional buffer of the first IC is configured as an output, and the third bidirectional buffer of the second IC is configured as an input. The output direction refers to when the data flows out of the second IC 360 and to the first IC 350 before being output from the device 300. More specifically, when the data flow is in the output direction, the third bidirectional buffer of the second IC is configured as an output, the second bidirectional buffer of the first IC is configured as an input, and the first bidirectional buffer of the first IC is configured as an output. In one embodiment, the initial direction of the data flow after the device 300 is powered up is preferably in the input direction. It is noted however that in other embodiments the initial direction may be in the output direction.

The driving direction of each of the bidirectional buffers 310, 320, and 330 may be independently changed at different times to change the direction of the data flow through the bidirectional digital I/O line 325. The order of the change preferably depends on whether the direction change is from the output direction to the input direction or from input direction to the output direction, as will be described below with reference to FIG. 4A and FIG. 4B. Since the driving direction of each of the bidirectional buffers may be changed at different times, a sequence of direction changes that minimizes problems related to the direction change is preferably implemented. For example, one or more sequences of direction changes may result in bus contention due to the double driving of the device bus 355.

FIGS. 4A and 4B: Improved Method for Buffering Bidirectional Lines

FIG. 4A and FIG. 4B are charts showing the sequence of direction changes corresponding to the first, second, and third bidirectional buffers 310, 320, and 330 of the first and second ICs 350 and 360 shown in FIG. 3, according to one embodiment of the invention. In one embodiment, the sequence of direction changes may be implemented in software, e.g., in the first and second control units 370 and 380, including an algorithm for synchronizing and controlling the direction changes. Both the first IC 350 and the second IC 360 may be configured with a protocol for implementing the algorithm. In one embodiment, the first and second ICs 350 and 360 are synchronized such that they implement the algorithm automatically and the second IC 360 begins to communicate with the first IC 350. In one embodiment, the algorithm may be deterministic, where the next step of the operation depends on the current state; for example, the algorithm may implement a specific sequence of direction changes at particular times, as will be further described below. Each of the first and second ICs 350 and 360 may be responsible for synchronizing the direction changes according to the sequence. For example, each of the first and second ICs 350 and 360 may be responsible for recognizing if the direction change may need to be delayed appropriately. In another embodiment, the sequence of direction changes may be implemented in both software and hardware. In yet another embodiment, the sequence of direction changes may be implemented in hardware.

It is noted that the input direction refers to the data being transmitted into the device 300 via, e.g., the first bidirectional digital I/O line 325 (as shown in FIG. 3). More specifically, when the data flow is in the input direction, the first bidirectional buffer 310 of the first IC 350 is configured as an input, the second bidirectional buffer 320 of the first IC 350 is configured as an output, and the third bidirectional buffer 330 of the second IC 360 is configured as an input. It is also noted that the output direction refers to the data being transmitted out of the device 300 via, e.g., the first bidirectional digital I/O line 325 (as shown in FIG. 3). More specifically, when the data flow is in the output direction, the third bidirectional buffer 330 of the second IC 360 is configured as an output, the second bidirectional buffer 320 of the first IC 350 is configured as an input, and the first bidirectional buffer 310 of the first IC 350 is configured as an output.

FIG. 4A is a chart showing the sequence of direction changes to change the direction of the data flow through the bidirectional digital I/O line 325 from an input direction to an output direction, according to one embodiment of the invention. Referring collectively to FIG. 3 and FIG. 4A, as described above, the CPU of the data acquisition system (e.g., system 100 of FIG. 1) may notify the second control unit 380 to change the direction of the data flow through the digital I/O line 325 from the input direction to the output direction. In response to the notification, the second control unit 380 may send a command to the first control unit 370 of the first IC 350 to change the driving direction of the first and the second bidirectional buffers 310 and 320. Also, the control unit 380 may change the driving direction of the third bidirectional buffer 330. In one embodiment, the first control unit 370 may receive the command signal from the second control unit 380 to determine whether to change the direction of data flow corresponding to the bidirectional digital I/O line 325.

The sequence of direction changes implemented by the first and second control units 370 and 380 to change the direction of the data flow through the digital I/O line 325 from the input direction to the output direction in response to the communication from the CPU is described below. First, the driving direction of the second bidirectional buffer 320 may be changed from the input direction to the output direction. In the next clock cycle, the driving direction of the third bidirectional buffer 330 may be changed from the input direction to the output direction. This direction change may start driving the data through the third bidirectional buffer 330 of the second IC 360, through the device bus 355 and through the second bidirectional buffer 320. Finally, in the following clock cycle, preferably after giving the data time to propagate through the first IC 350, the driving direction of the first bidirectional buffer 310 may be changed from the input direction to the output direction. After the driving direction of all three bidirectional buffers are changed as described above, the direction of the data flow is considered changed to the output direction and therefore the data may be output from the device 300. It is noted that the first and second ICs 350 and 360 may be synchronized to implement the direction changes during successive clock cycles.

It is noted that the above-described sequence for changing the driving direction of each of the bidirectional buffers 310, 320, and 330 independently at different times from the input direction to the output direction may avoid problems associated with other possible sequences. For example, initially changing driving direction of the third bidirectional buffer 330 (instead of the second bidirectional buffer 320) may result in bus contention due to the double driving of the device bus 355. In this example, both the third bidirectional buffer 330 and the second bidirectional buffer 320 may be driving the device bus 355 in opposite directions, since the second bidirectional buffer 320 may still be driving in the input direction. In another example, initially changing driving direction of the first bidirectional buffer 310 and subsequently (i.e., in the next clock cycle) changing the driving direction of the second bidirectional buffer 320 may result in the floating of the device bus 355, which may cause glitches to be output from the device 300.

FIG. 4B is a chart showing the sequence of direction changes to change the direction of the data flow through the bidirectional digital I/O line 325 from an output direction to an input direction, according to one embodiment of the invention. For example, a signal source (e.g., source 106 of FIG. 1) may communicate with the CPU of the corresponding computer system (e.g., computer system 101 of FIG. 1) to notify the second control unit 380 to change the direction of the data flow. Referring collectively to FIG. 3 and FIG. 4B, the sequence of direction changes implemented by the first and second control units 370 and 380 to change the direction of the data flow through the digital I/O line 325 from the output direction to the input direction in response to the communication from, e.g., a signal source is described below.

First, the driving direction of the first bidirectional buffer 310 is changed from the output direction to the input direction. This direction change may start driving the data through the first bidirectional buffer 310 of the first IC 350. In the next clock cycle, the driving direction of the third bidirectional buffer 330 is changed from the output direction to the input direction to preferably avoid bus contention. Finally, in the following clock cycle, the driving direction of the second bidirectional buffer 320 may be changed from the output direction to the input direction. After the driving direction of all three bidirectional buffers are changed as described above, the direction of the data flow is considered changed to the input direction and therefore the data may be received by the device 300. It is noted that the first and second ICs 350 and 360 may be synchronized to implement the direction changes during successive clock cycles.

It is noted that the above-described sequence for changing the driving direction of each of the bidirectional buffers 310, 320, and 330 independently at different times from the output direction to the input direction may avoid problems associated with other possible sequences. For example, initially changing driving direction of the second bidirectional buffer 320 may result in bus contention due to the double driving of the device bus 355. In this example, both the third bidirectional buffer 330 and the second bidirectional buffer 320 may be driving the device bus 355 in opposite directions, since the third bidirectional buffer 330 may still be driving in the output direction. In another example, initially changing driving direction of the third bidirectional buffer 330 (instead of the first bidirectional buffer 310) may result in the floating of the device bus 355, which may cause glitches to be output from the device 300.

It should be noted that in various embodiments, some of the steps described above with reference to FIG. 4A and FIG. 4B may be performed concurrently or omitted. Additional steps may also be performed as desired.

As described above, the order of changing the driving direction of each of the bidirectional buffers 310, 320, and 330 described above with reference to FIG. 4A and FIG. 4B may eliminate or greatly reduce bus contention and glitches from being output from the device 300. Furthermore, the design of the device 300 shown in FIG. 3 may also decrease the pin count compared to other designs. The device 300 preferably includes bidirectional buffers where the drivers are shorted together; therefore, a single pin may be needed for each of the bidirectional buffers. In designs using unidirectional buffers, the pin count is usually higher since two pins may be required for each of the unidirectional buffers.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus for changing the direction of a data flow when buffering bidirectional digital input/output (I/O) lines, the apparatus comprising:
    a first integrated circuit (IC) coupled to a first bidirectional digital I/O line, the first IC comprising:
        a first bidirectional buffer coupled to the first bidirectional digital I/O line,
        a second bidirectional buffer coupled to the first bidirectional buffer, and
        a first control unit operable to control the driving direction of each of the first and second bidirectional buffers independently to change the direction of the data flow from a first direction to a second direction; and
    a second IC coupled to the first IC, the second IC comprising:
        a third bidirectional buffer coupled to the second bidirectional buffer of the first IC, and
        a second control unit operable to control the driving direction of the third bidirectional buffer to change the direction of the data flow from the first direction to the second direction;
    wherein the data flow in the first direction corresponds to data being sent from the first IC to the second IC, and wherein the data flow in the second direction corresponds to data being sent from the second IC to the first IC;
    wherein, in changing the direction of the data flow from the first direction to the second direction, the first control unit is operable to change the driving direction of the second bidirectional buffer to the second direction during a first clock cycle, the second control unit is operable to change the driving direction of the third bidirectional buffer to the second direction during a second clock cycle, and the first control unit is operable to change the driving direction of the first bidirectional buffer to the second direction during a third clock cycle.

2. The apparatus of claim 1, wherein the second control unit is operable to send a command signal to the first control unit to control the changing of the direction of the data flow from the first direction to the second direction.

3. The apparatus of claim 1, wherein the first control unit is operable to send a control signal to each of the first and second bidirectional buffers to control the driving direction of each of the first and second bidirectional buffers independently.

4. The apparatus of claim 1, wherein the first IC is coupled to a plurality of bidirectional digital I/O lines, where the first control unit of the first IC and the second control unit of the second IC are operable to change the direction of the data flow through each of the plurality of bidirectional digital I/O lines independently by controlling the driving direction of the bidirectional buffers corresponding to each of the bidirectional digital I/O lines.

5. An apparatus for changing the direction of a data flow when buffering bidirectional digital input/output (I/O) lines, the apparatus comprising:
    a first integrated circuit (IC) coupled to a first bidirectional digital I/O line, the first IC comprising:
        a first bidirectional buffer coupled to the first bidirectional digital I/O line,
        a second bidirectional buffer coupled to the first bidirectional buffer, and
        a first control unit operable to control the driving direction of each of the first and second bidirectional buffers independently to change the direction of the data flow from a first direction to a second direction; and
    a second IC coupled to the first IC, the second IC comprising:
        a third bidirectional buffer coupled to the second bidirectional buffer of the first IC, and
        a second control unit operable to control the driving direction of the third bidirectional buffer to change the direction of the data flow from the first direction to the second direction;
    wherein the data flow in the first direction corresponds to data being sent from the second IC to the first IC, and wherein the data flow in the second direction corresponds to data being sent from the first IC to the second IC;
    wherein, in changing the direction of the data flow from the first direction to the second direction, the first control unit is operable to change the driving direction of the first bidirectional buffer to the second direction during a first clock cycle, the second control unit is operable to change the driving direction of the third bidirectional buffer to the second direction during a second clock cycle, and the first control unit is operable to change the driving direction of the second bidirectional buffer to the second direction during a third clock cycle.

6. A method for changing the direction of a data flow from a first direction to a second direction when buffering bidirectional digital input/output (I/O) lines in a device, wherein the device comprises a first integrated circuit (IC) coupled to a second IC, wherein the first IC comprises a first bidirectional buffer and a second bidirectional buffer and the second IC comprises a third bidirectional buffer, wherein the data flow in the first direction corresponds to data being sent from the first IC to the second IC, and wherein the data flow in the second direction corresponds to data being sent from the second IC to the first IC, the method comprising:

controlling the driving direction of each of the bidirectional buffers independently to change the direction of the data flow from the first direction to the second direction, said controlling the driving direction of each of the bidirectional buffers independently comprises:

changing the driving direction of the second bidirectional buffer to the second direction during a first clock cycle, changing the driving direction of the third bidirectional buffer to the second direction during a second clock cycle, and changing the driving direction of the first bidirectional buffer to the second direction during a third clock cycle.

7. The method of claim 6, wherein said controlling the driving direction of each of the bidirectional buffers independently further comprises sending a control signal to each of the bidirectional buffers to control the driving direction of each of the bidirectional buffers independently.

8. The method of claim 6, wherein the device is a data acquisition device.

9. The method of claim 6, further comprising changing the direction of the data flow through each of a plurality of bidirectional digital I/O lines independently by controlling the driving direction of the bidirectional buffers corresponding to each of the plurality of bidirectional digital I/O lines.

10. A method for changing the direction of a data flow from a second direction to a first direction when buffering bidirectional digital input/output (I/O) lines in a device, wherein the device comprises a first integrated circuit (IC) coupled to a second IC, wherein the first IC comprises a first bidirectional buffer and a second bidirectional buffer and the second IC comprises a third bidirectional buffer, wherein the data flow in the first direction corresponds to data being sent from the first IC to the second IC, and wherein the data flow in the second direction corresponds to data being sent from the second IC to the first IC, the method comprising:

controlling the driving direction of each of the bidirectional buffers independently to change the direction of the data flow from the second direction to the first direction, said controlling the driving direction of each of the bidirectional buffers independently comprises:

changing the driving direction of the first bidirectional buffer to the first direction during a first clock cycle, changing the driving direction of the third bidirectional buffer to the first direction during a second clock cycle, and changing the driving direction of the second bidirectional buffer to the first direction during a third clock cycle.

11. The method of claim 10, wherein said controlling the driving direction of each of the bidirectional buffers independently further comprises sending a control signal to each of the bidirectional buffers to control the driving direction of each of the bidirectional buffers independently.

12. The method of claim 10, wherein the device is a data acquisition device.

13. The method of claim 10, further comprising changing the direction of the data flow through each of a plurality of bidirectional digital I/O lines independently by controlling the driving direction of the bidirectional buffers corresponding to each of the plurality of bidirectional digital I/O lines.

14. A data acquisition system, comprising:

a computer system for processing data obtained from one or more data acquisition processes; and a data acquisition device coupled to the computer system for implementing the data acquisition processes and comprising circuitry for changing the direction of a data flow when buffering bidirectional digital input/output (I/O) lines, the data acquisition device comprising:

a first integrated circuit (IC) coupled to a first bidirectional digital I/O line, the first IC comprising:

a first bidirectional buffer coupled to the first bidirectional digital I/O line, a second bidirectional buffer coupled to the first bidirectional buffer, and a first control unit operable to control the driving direction of each of the first and second bidirectional buffers independently to change the direction of the data flow from a first direction to a second direction; and a second IC coupled to the first IC, the second IC comprising:

a third bidirectional buffer coupled to the second bidirectional buffer of the first IC, and a second control unit operable to control the driving direction of the third bidirectional buffer to change the direction of the data flow from the first direction to the second direction;

wherein the data flow in the first direction corresponds to data being sent from the first IC to the second IC, and wherein the data flow in the second direction corresponds to data being sent from the second IC to the first IC;

wherein, in changing the direction of the data flow from the first direction to the second direction, the first control unit is operable to change the driving direction of the second bidirectional buffer to the second direction during a first clock cycle, the second control unit is operable to change the driving direction of the third bidirectional buffer to the second direction during a second clock cycle, and the first control unit is operable to change the driving direction of the first bidirectional buffer to the second direction during a third clock cycle.

15. The data acquisition system of claim 14, further comprising a signal source coupled to the data acquisition device and operable to provide the data acquisition device with an input signal.

16. The data acquisition system of claim 15, wherein the signal source is a sensor comprised in a unit under test (UUT), wherein the signal source is operable to provide the data acquisition device with sensor data.

17. The data acquisition system of claim 14, wherein the second control unit is operable to send a command signal to the first control unit to control the changing of the direction of the data flow from the first direction to the second direction.

18. The data acquisition system of claim 17, wherein the first control unit is operable to receive the command signal to determine whether to change the direction of the data flow corresponding to the first bidirectional digital I/O line.

19. A data acquisition system, comprising:
a computer system for processing data obtained from one or more data acquisition processes; and
a data acquisition device coupled to the computer system for implementing the data acquisition processes and comprising circuitry for changing the direction of a data flow when buffering bidirectional digital input/output (I/O) lines, the data acquisition device comprising:
a first integrated circuit (IC) coupled to a first bidirectional digital I/O line, the first IC comprising:
a first bidirectional buffer coupled to the first bidirectional digital I/O line,
a second bidirectional buffer coupled to the first bidirectional buffer, and
a first control unit operable to control the driving direction of each of the first and second bidirectional buffers independently to change the direction of the data flow from a first direction to a second direction; and
a second IC coupled to the first IC, the second IC comprising:
a third bidirectional buffer coupled to the second bidirectional buffer of the first IC, and
a second control unit operable to control the driving direction of the third bidirectional buffer to change the direction of the data flow from the first direction to the second direction;
wherein the data flow in the first direction corresponds to data being sent from the second IC to the first IC, and wherein the data flow in the second direction corresponds to data being sent from the first IC to the second IC;
wherein, in changing the direction of the data flow from the first direction to the second direction, the first control unit is operable to change the driving direction of the first bidirectional buffer to the second direction during a first clock cycle, the second control unit is operable to change the driving direction of the third bidirectional buffer to the second direction during a second clock cycle, and the first control unit is operable to change the driving direction of the second bidirectional buffer to the second direction during a third clock cycle.

* * * * *